3,449,417
BENZENESULPHONYL-UREAS AND PROCESS FOR PREPARING THEM
Helmut Weber, Frankfurt am Main, Karl Muth, Kelkheim, Taunus, Rudi Weyer, Frankfurt am Main, Walter Aumüller, Kelkheim, Taunus, and Felix Helmut Schmidt, Mannheim-Neuostheim, Germany, assignors to Farbwerke Hoechst Aktiengesellschaft vormals Meister Lucius & Bruning, Frankfurt am Main, Germany, a corporation of Germany
No Drawing. Filed Dec. 22, 1965, Ser. No. 515,755
Claims priority, application Germany, Dec. 28, 1964, F 44,822
Int. Cl. C07c *147/06*
U.S. Cl. 260—553                    3 Claims

ABSTRACT OF THE DISCLOSURE

Benzenesulfonyl-ureas with hypoglycemic activity having the general formula

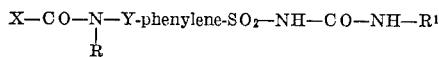

in which:

R is hydrogen, lower alkyl or phenyl lower alkyl;
R$^1$ is (a) alkyl or alkenyl of 2–8 carbon atoms, (b) phenyl lower alkyl, (c) cyclohexyl lower alkyl, (d) endoalkylene cyclohexyl, endoalkylene-cyclohexenyl, endoalkylene-cyclohexyl-methyl or endoalkylene-cyclohexenyl-methyl with 1–2 carbon atoms in the endoalkylene part, (e) lower alkylcyclohexyl, lower alkoxycyclohexyl, (f) cycloalkyl of 5 to 8 carbon atoms, (g) cyclohexenyl or cyclohexenylmethyl;
X is an alkylene or alkenylene of one to three carbon atoms substituted by one or two chlroine or bromine atoms or by a cyano group, no carbon atom being substituted by more than one such substitutent;
Y is an alkyl chain of 1–4 carbon atoms; and physiologically tolerance salts thereof.

The present invention provides benzenesulfonyl-ureas corresponding to the general formula

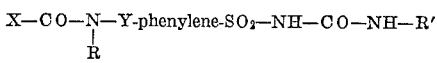

and salts of the above-mentioned compounds.
In the above-mentioned formula

R represents hydrogen, lower alkyl or phenyl lower alkyl,
R' represents (a) alkyl, alkenyl with 2–8 carbon atoms, (b) phenyl lower alkyl, (c) cyclohexyl lower alkyl, (d) endoalkylene-cyclohexyl, endoalkylene-cyclohexenyl, endoalkylene-cyclohexylmethyl or endoalkylene-cyclohexenylmethyl with 1–2 carbon atoms in the endoalkylene part, (e) lower alkylcyclohexyl, lower alkoxycyclohexyl, (f) cycloalkyl with 5 to 8 carbon atoms, (g) cyclohexenyl, cyclohexenylmethyl,
X represents a hydrocarbon radical with 1–3 carbon atoms substituted by one or two chlorine or bromine atoms or by a cyano group, one carbon atom carrying in each case 1 substitutent only,
Y represents an alkyl chain with 1–4 carbon atoms.

In the above-mentioned and in the following definitions "lower alkyl" always stands for a lower alkyl group having 1 to 4 carbon atoms in straight or ramified chain.

According to the definitions given above, R may, for instance, stand for: a methyl, ethyl, propyl, isopropyl, butyl, isobutyl, tert.butyl, benzyl, α- or β-phenylethyl, α-, β- or γ-phenylpropyl group, compounds wherein R represents methyl or benzyl, and, in particular, those in which R stands for hydrogen, being preferred.

R' may represent, for instance, ethyl, propyl, isopropyl, butyl, isobutyl, sec. butyl, straight-chained or ramified amyl (pentyl), hexyl, heptyl, or octyl; as well as the radicals correspondiing to said hydrocarbon radicals and containing an ethylenic double linkage such, for instance, as allyl or crotyl. Furthermore, there are appropriate as R': benzyl, α-phenylethyl, β-phenylethyl, α-, β- or γ-phenylpropyl or phenyl-butyls.

In the sense of the invention there are especially preferred compounds which as R' contain a cycloaliphatic hydrocarbon radical which may be substituted by alkyl or alkoxy or linked to the nitrogen atom by means of alkylene. As groups of said type there are mentioned for instance: cyclopentyl, cyclohexyl, cycloheptyl, cyclooctyl, methylcyclohexyl, ethyl-cyclohexyl, propyl-cyclohexyl, isopropyl-cyclohexyl, methoxy-cyclohexyl, ethoxy-cyclohexyl, propoxy-cyclohexyl and isopropoxy-cyclohexyl, the alkyl or alkoxy groups preferably being in 4-position, as well as in cis- or in trans-position; there are likewise named: cyclohexylmethyl, α- or β-cyclohexylethyl, endo-methylene-cyclohexyl-(2,2,1 - tricycloheptyl), endoethylene-cyclohexyl-(2,2,2-tricyclo-octyl), endomethylene-cyclohexenyl, endoethylene-cyclohexenyl, endomethylene-cyclohexylmethyl, endoethylene-cyclohexenylmethyl, endomethylene-cyclohexenylmethyl, or endoethylene-cyclohexenylmethyl.

X represents a saturated or unsaturated, straight-chained or ramified hydrocarbon radical with 1 to 3 carbon atoms substituted by one or 2 chlorine or bromine atoms or a cyano group, one carbon atom carrying in each case one substituent only.

The alkyl group designated by Y may be straight-chained or ramified.

The phenylene radical indicated in the formula by "phenylene" may be unsubstituted or, preferably, mono- or polysubstituted by halogen, lower alkyl or lower alkoxy. It may carry the remaining parts of the molecule in o-, m- or p-position to each other, the para-position being preferred.

The above-mentioned benzenesulfonyl-ureas may be prepared according to various methods.

For instance, it is possible (a) to react amines of the formula R'NH$_2$ or their salts with benzenesulfonyl-isocyanates, benzenesulfonyl-carbamic acid esters, benzenesulfonyl-thiocarbamic acid esters, benzenesulfonyl-carbamic acid halides or benzenesulfonyl-ureas carrying the substitutent

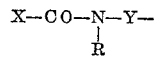

(b) to react benzenesulfonamides or their salts carrying the substitutent

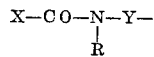

with R'-substituted isocyanates, carbamic acid esters, thiocarbamic acid esters, carbamic acid halides or benzenesulfonyl-ureas; (c) to react benzenesulfonyl-chlorides carrying the substituent

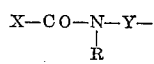

with R'-substituted ureas, isourea-ethers, isothiourea-ethers or parabanic acids and to hydrolize the benzenesulfonyl-isourea ethers, benzenesulfonyl-isothiourea ethers or benzenesulfonyl-parabanic acids obtained by the above-described or any other method; (d) to replace in correspondingly substituted benzenesulfonyl-thioureas the sulfur atom by an oxygen atom; (e) to oxydize correspondingly substituted benzenesulfonyl-ureas or benzenesulfonyl-ureas; (f) to introduce into benzenesulfonyl-ureas corresponding to the formula

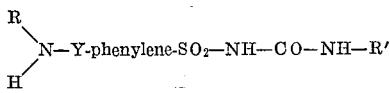

by acylation in one or several stages the radical X—CO— and, if desired, to treat the products obtained with alkaline agents in order to produce the salts.

According to the nature of the members X and R', the one or the other of the above-mentioned processes will, in single cases, be unsuitable for the preparation of the individual compounds corresponding to the general formula or will, at least, require means for the protection of active groups. Such cases, which do not occur very often can be recognized easily by the expert, and there will be no difficulties to apply with success another one of the syntheses described above.

The above-mentioned benzenesulfonyl-carbamic acid esters or benzenesulfonyl-thiocarbamic acid esters may contain in the alcohol component a lower alkyl radical or a phenyl radical. The same applies to the R'-substituted carbamic acid esters or the corresponding monothiocarbamic acid esters.

As carbamic acid halides, there are appropriate, above all, the chlorides.

By "benzenesulfonyl-ureas" there are likewise understood those unsubstituted or mono- or disubstituted preferably by lower alkyl or aryl groups at the side of the urea molecule opposite to the sulfonyl group. In the case of a substitution by two aryl groups the latter may be linked to each other by a chemical linkage or by means of a bridge member such as —CH$_2$—, —NH—, —O— or —S—. Instead of benzenesulfonyl-ureas substituted as described above there can likewise be used corresponding N-benzenesulfonyl-N'-acyl-ureas which, moreover, may be alkylated or arylated at the N'-nitrogen atom, as well as bis-(benzenesulfonyl)-ureas. For example, said bis-(benzenesulfonyl)-ureas or N-benzenesulfonyl-N'-acyl-ureas can be treated with amines R'NH$_2$. In the sense of the invention "ureas" are compounds corresponding to the formula R'—NH—CO—NH$_2$ or acylated ureas of the formula R'—NH—CO—NH-acyl, wherein acyl represents a preferably low-molecular aliphatic or aromatic acid radical or the nitro group, or phenyl-ureas of the formula R'—NH—CO—NH—C$_6$H$_5$ or diphenyl-ureas of the formula

R'—NH—CO—N(C$_6$H$_5$)$_2$— the phenyl radicals being substituted or linked to each other directly or likewise by means of a bridge member such as —CH$_2$—, —NH—, —O— or —S— or N,N-disubstituted ureas of the formula

R'—NH—CO—NH—R'

The sulfur atom in the corresponding benzenesulfonyl-thioureas can be replaced by an oxygen atom, for instance with the aid of oxides or salts of heavy metals or likewise by applying oxidizing agents such as hydrogen peroxide, sodium-peroxide or nitrous acid. The thio-ureas may also be desulfurized by treating them with phosgene or phosphorus pentachloride. Chloroformic acid amidines or chloroformic acid carbodiimides obtained as intermediate products can be converted into the benzenesulfonyl-ureas by applying appropriate measures such as, for instance, hydrolysis or addition of water.

The methods of operation of the process according to the invention may vary as regards the reaction conditions and may be adapted to each individual case. For example, the reactions may be carried out with the use of solvents, at room temperature or at an elevated temperature.

As starting substances there are used, on the one hand, compounds containing a benzene radical substituted by the group

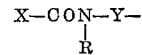

As examples for the component X—CO— of said formula there are mentioned: ClCH$_2$—, ClCH$_2$—CH$_2$—, Cl—CH$_2$—CH$_2$—CH$_2$—, (CH$_3$)$_2$CCl,

CH$_2$=CCl—, CH$_2$Cl—CHCl—, Br—CH$_2$—CH$_2$—, CH$_3$—CHBr—, Br—CH$_2$—CH$_2$—CH$_2$—, NC—CH$_2$—, NC—C(CH$_3$)$_2$—.

The benzenesulfonyl-urea derivatives obtained according to the process of the present invention are valuable medicaments distinguished, above all, by a strong and long-lasting hypoglycemic action. Their hypoglycemic activity can be ascertained, for instance, in rabbits by administering them the products of the invention in doses of 10 mg./kg. and determining the blood surgar value for a prolonged period according to the known method of Hagedorn-Jensen.

It was, for instance, found that the N-[4-($\beta$-<$\beta$-chloropropionamido>-ethyl) - benzenesulfonyl] - N'-cyclohexyl-urea caused a maximum hypoglycemia of 20%, measured after 3 hours.

When comparing therewith the N-(4-methyl-benzenesulfonyl)-N'-butyl-urea known as oral antidiabetic and used in all parts of the world, it is found that with the above-mentioned dose of 10 mg./kg. no blood sugar lowering can be ascertained in rabbits. Only with doses of at least 25 mg./kg. a blood sugar reaction is observed.

The strong activity of the products of the invention is distinctly demonstrated when the dose is reduced. If N-[4-($\beta$-<$\beta$ - chloro - propionamido>-ethyl)-benzenesulfonyl]-N'-(4-methyl-cyclohexyl)-urea is given in a dose of 0.4 mg./kg. to the rabbit, a distinct reduction of the blood sugar value can still be observed.

The benzenesulfonyl-ureas described above are preferably used for the manufacture of orally administerable pharmaceutical preparations showing blood sugar lowering action in the treatment of diabetes mellitus and can be used as such or in the form of their salts or in the presence of substances causing salt formation. For the formation of salts there may be used:

Alkaline agents, for example, alkali metal hydroxides, alkaline earth metal hydroxides, alkali metal carbonates, alkaline earth metal carbonates, alkali metal bicarbonates, alkaline earth metal bicarbonates, but likewise organic bases, especially tertiary nitrogen bases if they are physiologically tolerated.

The pharmaceutical preparations are preferably in the form of tablets containing in addition to the compounds of the invention the usual adjuvants and carriers such as talc, starch, lactose, tragacanth or magnesium stearate.

A preparation containing the above-mentioned benzenesulfonyl-ureas as active substance, for instance, a tablet or a powder, with or without the above-mentioned additions, is favorably brought into a suitable dosage unit form. The dose chosen should comply with the activity of the benzenesulfonyl-urea used and the desired effect. Favorably, the dosage per unit amounts to from 0.5 to 100 milligrams, preferably from 2 to 10 milligrams, but considerably higher or lower dosage units can likewise be used which, if desired, are divided or multiplied prior to application.

The following example serves to illustrate the invention but it is not intended to limit it thereto:

EXAMPLE

N-[4-($\beta$-<$\beta$-chlorpropionamido>-ethyl)-benzene sulfonyl]-N'-(4-methyl-cyclohexyl)-urea 14.5 grams of 4-($\beta$-<$\beta$-chlorpropionamido>-ethyl)-benzenesulfonamide are dissolved in 25 ml. of 2 N-sodium hydroxide solution and 50 ml. of acetone and 7.2 grams of 4 - methylcyclohexyl - isocyanate are dropwise added at 0–5° C. Stirring is continued for 3 hours, the solution is then diluted with water and a small amount of methanol, any undissolved matter is filtered off and the filtrate is acidified. The N-[4-(β-<β-chlorpropionamido>-ethyl)-benzenesulfonyl]-N'-(4-methyl-cyclohexyl)-urea obtained after recrystallization from methanol melts at 163–164° C.

In an analogous manner there are obtained:

N - [4 - (β - <β-chlorpropionamido>-ethyl)-benzenesulfonyl]-N'-cyclohexyl-urea melting at 154–155° C. after having been recrystallized from methanol, N - [4 - (β - <β-chlorpropionamido>-ethyl)-benzenesulfonyl]-N'-butyl-urea melting at 128–129° C., after having been recrystallized from methanol, and N - [4 - (β - <β-chlorpropionamido>-ethyl)-benzenesulfonyl[-N'-(4-ethyl-cyclohexyl)-urea (trans) melting at 170–172° C. after having been recrystallized from methanol.

From 4-(β-chloracetamido-ethyl)-benzenesulfonamide

The N - [4-(β-chloracetamido-ethyl)-benzenesulfonyl]-N'-cyclooctyl-urea melting at 143–145° C. after recrystallization from acetone; and The N-[4-(β-chloracetamido-ethyl)-benzenesulfonyl]-N'-cyclohexyl-urea melting at 161–163° C. after recrystallization from acetone.

From 4 - (β - <γ-chlorbutyramido>-ethyl)-benzenesulfonamide

The N - [4-(β-<γ-chlorbutyramido>-ethyl)-benzenesulfonyl]-N'-cyclohexyl-urea melting at 155–156° C. after recrystallization from methanol and The N - [4-(β-<γ-chlorbutyramido>-ethyl)-benzenesulfonyl]-N'-(4-methyl-cyclohexyl)-urea (trans) melting at 153–155° C. after recrystallization from methanol;

From 4-(β-<γ-bromopropionamido>-ethyl)-benzenesulfonamide (melting point 148–150° C.)

The N - [4-(β-<α-bromopropionamido>-ethyl)-benzenesulfonyl]-N'-cyclooctyl-urea melting at 201–202° C. after recrystallization from methanol, The N - [4-(β-<α-bromopropionamido>-ethyl)-benzenesulfonyl]-N'-butyl-urea melting at 171–173° C. after recrystallization from methanol, The N - [4-(β-<α-bromopropionamido>-ethyl)-benzenesulfonyl]-N'-cyclohexyl-urea melting at 203–205° C. after recrystallization from methanol, and The N - [4-(β-<α-bromopropionamido>-ethyl)-benzenesulfonyl]-N'-(4-methyl-cyclohexyl-urea (trans) melting at 195–197° C. after recrystallization from methanol.

From 4-(γ-chloracetamido-propyl)-benzenesulfonamide (melting point 140–142° C.)

The N-[4-(γ-chloracetamido-propyl)-benzenesulfonyl]-N'-cyclohexyl-urea melting at 168° C. after recrystallization from ethanol, The N-[4-(γ-chloracetamido-propyl)-benzenesulfonyl]-N'-n-butyl-urea melting at 121° C. after recrystallization from a mixture of ethanol and water, The N-[4-(γ-chloracetamido-propyl)-benzenesulfonyl]-N'-(4-methyl-cyclohexyl)-urea melting at 153° C. after recrystallization from a mixture of ethanol and water.

From 4 - [β-(β-chloropropionamido)-propyl]-benzenesulfonamide (melting point 132° C.)

The N - [4-(β-<β-chloropropionamido>-propyl)-benzenesulfonyl]-N'-cyclohexyl-urea melting at 177° C. after recrystallization from a mixture of ethanol and water, The N - [4-(β-<β-chloropropionamido>-propyl)-benzenesulfonyl]-N'-(4-methyl-cyclohexyl)-urea melting at 194° C. after recrystallization from ethanol, The N - [4-(β-<β-chloropropionamido>-propyl)-benzenesulfonyl] - N' - (4-ethyl-cyclohexyl)-urea melting at 166° C. after recrystallization from ethanol.

From 4 - [γ-(β-chloropropionamido)-propyl]-benzenesulfonamide (melting point 135° C.)

The N - [4-(γ-<β-chloropropionamido>-propyl)-benzenesulfonyl]-N'-cyclohexyl-urea melting at 152° C. after recrystallization from ethanol, The N - [4-(γ-<β-chloropropionamido>-propyl)-benzenesulfonyl]-N'-(4-methyl-cyclohexyl)-urea melting at 162° C. after recrystallization from ethanol.

In an analogous manner there is obtained:

The N - [4-(β-<β-chloropropionamido>-ethyl)-benzenesulfonyl]-N'-(Δ³-cyclohexenyl)-urea melting at 193–195° C.

What we claim is:

1. A compound of the formula

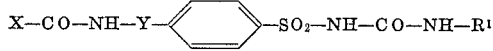

wherein:

R¹ is (a) alkyl of 2–8 carbon atoms; (b) cyclohexyl lower alkyl; (c) endoalkylene-cyclohexyl, endoalkylene-cyclohexenyl, endoalkylene-cyclohexylmethyl or endoalkylene-cyclohexenylmethyl with 1–2 carbon atoms in the endoalkylene moiety; (d) lower alkyl-cyclohexyl, lower alkoxycyclohexyl; (e) cycloalkyl of 5 to 8 carbon atoms; (f) cyclohexenyl, cyclohexenylmethyl;

X is alkyl or alkenyl of 1–3 carbon atoms substituted by one or two chlorine or bromine atoms or by a cyano group, no carbon atom being substituted by more than one such substituent;

Y is an alkylene of 2–3 carbon atoms; and physiologically tolerable salts thereof.

2. N - [4-(β-<β-chloropropionamido>-ethyl)-benzenesulfonyl]-N'-cyclohexyl-urea of the formula

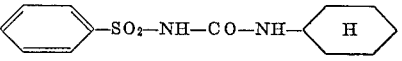

and physiologically tolerable salts thereof.

3. N - [4-(β-<β-chloropropionamido>-ethyl)-benzenesulfonyl]-N'-4'-methyl-cyclohexyl urea of the formula

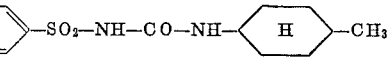

and physiologically tolerable salts thereof.

References Cited

FOREIGN PATENTS 873,464   7/1961   England.
34,97M   8/1965   France.

OTHER REFERENCES

Momose et al., J. Pharm. Soc. Japan, vol. 81, pp. 1045 to 1047 (1961).

JOHN D. RANDOLPH, *Primary Examiner.*

U.S. Cl. X.R.

260—552, 465, 556, 544, 545, 471, 999